(12) United States Patent
Wang et al.

(10) Patent No.: US 11,591,466 B2
(45) Date of Patent: Feb. 28, 2023

(54) POLYMER COMPOSITION AND ARTICLE MADE FROM THE SAME

(71) Applicant: Covestro Intellectual Property GmbH & Co. KG, Leverkusen (DE)

(72) Inventors: Leith Wang, Shanghai (CN); Xiaoxiang Wang, Shanghai (CN)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 0 days.

(21) Appl. No.: 17/637,836

(22) PCT Filed: Aug. 27, 2020

(86) PCT No.: PCT/EP2020/073912
§ 371 (c)(1),
(2) Date: Feb. 24, 2022

(87) PCT Pub. No.: WO2021/043653
PCT Pub. Date: Mar. 11, 2021

(65) Prior Publication Data
US 2022/0267592 A1    Aug. 25, 2022

(30) Foreign Application Priority Data

Sep. 5, 2019  (WO) ................. PCT/CN2019/104482
Sep. 11, 2019  (EP) ..................................... 19196593

(51) Int. Cl.
| | |
|---|---|
| *C08L 67/02* | (2006.01) |
| *B32B 15/09* | (2006.01) |
| *B32B 15/20* | (2006.01) |
| *B29C 45/14* | (2006.01) |
| *B29K 67/00* | (2006.01) |
| *B29K 705/02* | (2006.01) |
| *B29L 31/34* | (2006.01) |

(52) U.S. Cl.
CPC .............. *C08L 67/02* (2013.01); *B32B 15/09* (2013.01); *B32B 15/20* (2013.01); *B29C 45/14* (2013.01); *B29C 2045/14868* (2013.01); *B29K 2067/006* (2013.01); *B29K 2705/02* (2013.01); *B29L 2031/3481* (2013.01); *B32B 2250/02* (2013.01)

(58) Field of Classification Search
None
See application file for complete search history.

(56) References Cited

U.S. PATENT DOCUMENTS

| | | | |
|---|---|---|---|
| 4,269,964 A | 5/1981 | Freitag et al. | |
| 4,334,053 A | 6/1982 | Freitag et al. | |
| 2003/0010971 A1* | 1/2003 | Zhang | H01L 29/0676 257/15 |
| 2015/0197048 A1* | 7/2015 | Chiang | C25D 11/24 428/307.3 |
| 2015/0368458 A1 | 12/2015 | Sun et al. | |
| 2017/0029615 A1 | 2/2017 | He et al. | |

FOREIGN PATENT DOCUMENTS

| | | |
|---|---|---|
| CA | 1173998 A | 9/1984 |
| DE | 3832396 A1 | 2/1990 |
| WO | 2017187384 A1 | 11/2017 |
| WO | 2019130269 A1 | 7/2019 |

OTHER PUBLICATIONS

International Search Report, PCT/EP2020/073912, dated Sep. 16, 2020, Authorized officer: Stephane Bezard.

* cited by examiner

*Primary Examiner* — Tae H Yoon
(74) *Attorney, Agent, or Firm* — John E. Mrozinski, Jr.

(57) ABSTRACT

The present application relates to a polymer composition comprising from 20 wt % to 30 wt % of a polycarbonate; from 40 wt % to 60 wt % of a polybutylene terephthalate; from 5 wt % to 30 wt % of a reinforcement fiber; from 1 wt % to 10 wt % of glass bubbles, and from 0.3 wt % to 2 wt % of transesterification inhibitor, all contents are based on the total weight of the composition. The polymer composition according to the present invention has improved adhesion to the metal (especially aluminum), even after annealing and anodizing processes are applied.

15 Claims, No Drawings

POLYMER COMPOSITION AND ARTICLE MADE FROM THE SAME

CROSS REFERENCE TO RELATED APPLICATIONS

This application is a national stage application under 35 U.S.C. § 371 of PCT/EP2020/073912, filed Aug. 27, 2020, which claims benefit of European Application No. 19196593.8, filed Sep. 11, 2019, and PCT/CN2019/104482, filed Sep. 5, 2019, all of which are incorporated herein by reference in their entireties.

TECHNICAL FIELD

The present invention relates to a polymer composition, particularly, a polymer composition for use in combination with metal substrate for electronic device and an article made from the same.

BACKGROUND ART

Metal housings are widely used for electronic devices such as mobile phones or personal digital assistants (PDAs). Antennas are also important components in electronic devices. The metal housing may generate an electromagnetic shield to an antenna located in the metal housing, thus the signal of the antenna is often shielded by the metal housing.

Currently, in order to ensure the communication quality of electronic devices, a slot is opened on the metal housing to allow the signal of the antenna reach the outside of the metal housing. The slot is filled with a plastic resin to connect the parts separated by the slot. The plastic resin can be applied by nano molding technology (NMT). The NMT process mechanically bonds plastic resin to metal by etching the metal surface and injection molding the plastic resin onto the etched surface of the metal. Accordingly, high bonding strength between the plastic resin and metal is critical for such applications.

U.S. patent application US2017/0029615 discloses a glass fiber reinforced blended thermoplastic compositions, the molded parts made from inventive compositions can have a bonding strength greater than 25 MPa, which is not enough for certain applications.

WO2017/187384 discloses a thermoplastic composition including a polymeric base resin, a glass fiber component, and a laser direct structuring additive. The polymeric base resin includes polybutylene terephthalate, polyamide, polycarbonate, poly(p-phenylene oxide), or combination thereof. The thermoplastic composition has a nano molding technology (NMT) bonding strength of at least about 20 Mpa when bonding to aluminum alloy.

In addition, many plastic resins used to connect the separated parts of metal-based housings generally have high dielectric constant, which will adversely impact the capability of the antenna to receive and/or emit signals.

Efforts have been made to adjust the dielectric constant by adjusting the component for the plastic resin. However, it was found that when the dielectric constant of the plastic resin meets the requirement for use in metal-based housing, the mechanical property, i.e. bonding strength to the metal is lowered.

It is also desired that the plastic resin can remain the light weight feature of the thin wall metal-based housing.

Although significant research and development efforts have been made, there is still a need for a plastic material to be used in combination with metal housing for electric devices, which has a good balance among bonding strength to metal, especially to aluminum that is often used in metal housing for mobile phones, and low dielectric constant as well as light weight.

SUMMARY OF THE INVENTION

The present invention aims to provide a plastic material to be used in in combination with metal housing for electric devices, which has a good balance among bonding strength to metal, especially that often used in metal housing for mobile phones, and dielectric constant as well as light weight.

Thus, according to one aspect, the present invention provides a polymer composition comprising:
A). from 20 wt % to 30 wt % of a polycarbonate;
B). from 40 wt % to 60 wt % of a polybutylene terephthalate;
C). from 5 wt % to 30 wt % of a reinforcement fiber;
D). from 1 wt % to 10 wt % of glass bubbles, and
E). from 0.3 wt % to 2 wt % of transesterification inhibitor, all contents are based on the total weight of the composition.

The polymer composition according to the present invention has improved adhesion to the metal (especially aluminum), even after chemical etching and anodizing processes are applied.

The polymer composition according to the present invention has a bonding strength of more than 30 megapascals (MPa) when bonded to aluminum or alloy thereof.

In addition, due to the presence of glass bubbles, a light-weight plastic part can be made from the polymer composition according to the present invention.

The polymer composition according to the present invention can be used to produce an article comprising a metal substrate and thereon a plastic part made from the polymer composition according to the present invention.

According to another aspect, the present invention provides an article comprising:
a metal substrate; and
a plastic part made from the polymer composition according to the present invention on the metal substrate.

According to still another aspect, the present invention provides a process for producing an article, comprising:
forming a plastic part with the polymer composition according to the present invention on the metal substrate.

Other subjects and characteristics, aspects and advantages of the present invention will emerge even more clearly on reading the detailed description and the examples that follows.

DETAILED DESCRIPTION OF THE INVENTION

According to one aspect, the present invention provides according to one aspect, the present invention provides a polymer composition comprising:
A). from 20 wt % to 30 wt % of a polycarbonate;
B). from 40 wt % to 60 wt % of a polybutylene terephthalate;
C). from 5 wt % to 30 wt % of a reinforcement fiber
D). from 1 wt % to 10 wt % of glass bubbles, and
E). from 0.3 wt % to 2 wt % of transesterification inhibitor,
all contents are based on the total weight of the composition.

As used herein, any amount or value used to indicate the content of a component, a processing parameter, etc, is understood to be modified by the term "about".

As used herein, unless otherwise indicated, the limits of a range of values are included within this range, in particular in the expressions "of between" and "ranging from . . . to . . . ".

As used herein, the expression "at least one" used in the present description is equivalent to the expression "one or more".

As used herein, the term "comprising" is to be interpreted as encompassing all specifically mentioned features as well optional, additional, unspecified ones.

As used herein, the use of the term "comprising" also discloses the embodiment wherein no features other than the specifically mentioned features are present (i.e. "consisting of").

Unless defined otherwise, all technical and scientific terms used herein have the same meaning as commonly understand by one of ordinary skill in the art to which the present invention pertains.

Polycarbonate

According to the first aspect of the present invention, a polycarbonate is used in the polymer composition.

Polycarbonates suitable for the present invention are preferably aromatic polycarbonates, which are known from the literature or may be produced by processes known from the literatures (for the production of aromatic polycarbonates see for example Schnell, "Chemistry and Physics of Polycarbonates", Interscience Publishers, 1964 and DE 3 832 396 A1 from diphenols of the formula (2)).

Aromatic polycarbonates are produced e.g. by the melt process or by reaction of diphenols with carbonic acid halides, preferably phosgene and/or with aromatic dicarboxylic acid dihalides, preferably benzene dicarboxylic acid dihalides, by the phase interface process, optionally using chain stoppers, for example monophenols and optionally using trifunctional or more than trifunctional branching agents, for example triphenols or tetraphenols.

In a preferred embodiment, the aromatic polycarbonate is based on a diphenol of the formula (I):

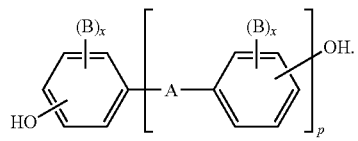

(I)

Wherein

A is a single bond, $C_1$-$C_5$-alkylene, $C_2$-$C_5$-alkylidene, $C_5$-$C_6$-cycloalkylidene, —O—, —SO—, —CO—, —S—, —$SO_2$—, $C_6$-$C_{12}$-arylene, onto which further aromatic rings, optionally containing heteroatoms, may be condensed, or a group of the formula (II) or (III):

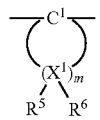

(II)

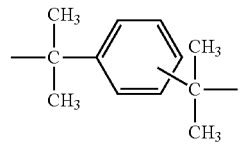

(III)

B is, in each case, $C_1$-$C_{12}$-alkyl, preferably methyl, halogen, preferably chlorine and/or bromine, x in each case, independently of each other, is 0, 1 or 2, p is 1 or 0, and $R^5$ and $R^6$ may be selected individually for each $X^1$, independently of each other, as hydrogen or $C_1$-$C_6$-alkyl, preferably hydrogen, methyl or ethyl, $X^1$ is carbon, and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-$C_6$-$C_{12}$-arylene, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane;

diphenols of general formula (IVa):

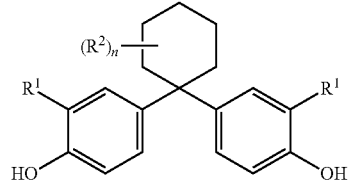

(IVa)

in which $R^1$ represents hydrogen or $C_1$-$C_4$-alkyl, preferably hydrogen, $R^2$ represents $C_1$-$C_4$-alkyl, preferably methyl, and n represents 0, 1, 2 or 3, preferably 3; and diphenols of general formulae (IVb), (IVc) and (IVd):

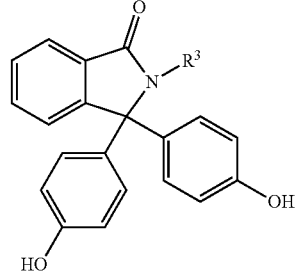

(IVb)

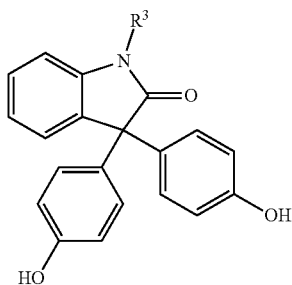

(IVc)

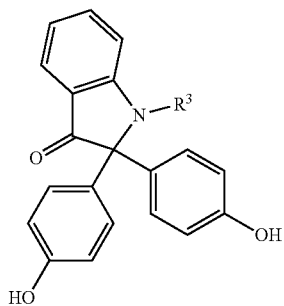

(IVd)

in which $R^3$ represents $C_1$-$C_4$-alkyl, aralkyl or aryl, preferably methyl or phenyl, very particularly preferably phenyl.

The diphenols are known from literatures or may be obtained by processes known from literatures.

It is possible to use one diphenol with formation of homopolycarbonates and a plurality of diphenols with the formation of copolycarbonates.

According to a further preferred embodiment, the aromatic polycarbonate is based on a diphenol selected from bis-(hydroxyphenyl)-$C_1$-$C_5$-alkanes and diphenols of general formula (IVa'):

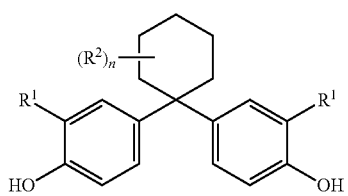

(IVa')

in which $R^1$ represents hydrogen or $C_1$-$C_4$-alkyl, preferably hydrogen, $R^2$ represents $C_1$-$C_4$-alkyl, preferably methyl, and n represents 0, 1, 2 or 3, preferably 3.

According to a further preferred embodiment, the aromatic polycarbonate is a homopolycarbonate based on bisphenol A (2, 2-bis-(4-hydroxyphenyl)-propane).

According to a further preferred embodiment, the aromatic polycarbonate is a polycarbonate based on bisphenol A and 1, 1-bis-(4-hydroxyphenyl)-3, 3, 5-trimethylcyclohexane (Bisphenol TMC) having the formula (IVa"):

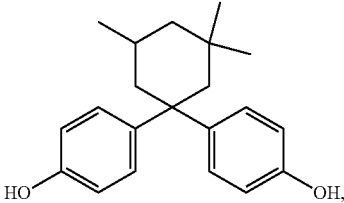

(IVa")

the molar ratio of diphenol of the formula (IVa") to bisphenol A is between 1%:99% and 99%:1%, preferably between 10%:90% and 90%:10%, more preferably between 20%:80% and 80%:20%, most preferably between 30%:70% and 70%:30%.

Suitable chain stoppers for the production of the thermoplastic, aromatic polycarbonates are for example phenol, p-chlorophenol, p-tert.-butyl phenol or 2,4,6-tribromophenol, but also long chain alkyl phenols such as 4-(1,3-tetramethylbutyl)-phenol according to DE-OS 2 842 005 or monoalkylphenol or dialkyl phenols containing a total of 8 to 20 C atoms in the alkyl substituents such as 3,5-di-tert.-butyl phenol, p-iso-octyl phenol, p-tert-octyl phenol, p-dodecyl phenol and 2-(3,5-dimethylheptyl)-phenol and 4-(3,5-dimethylheptyl)-phenol. The quantity of chain stoppers to be used is generally 0.5 mol. % to 10 mol. %, in relation to the molar sum of the diphenols used in each case.

The thermoplastic aromatic polycarbonates may be branched in the known way, and preferably by incorporating 0.05 to 2.0 mol. % in relation to the sum of the diphenols used, of trifunctional or more than trifunctional compounds, for example those having three or more phenolic groups.

Aromatic dicarboxylic acid dihalides for the production of aromatic polycarbonates are preferably the diacid dichlorides of isophthalic acid, terephthalic acid, diphenylether-4, 4'-dicarboxylic acid and naphthaline-2, 6-dicarboxylic acid.

When producing polycarbonates, a carbonic acid halide, preferably phosgene is also used as a bifunctional acid derivative.

In addition to the monophenols already mentioned, their chlorocarbonic acid esters and the acid chlorides of aromatic monocarboxylic acids, which may optionally be substituted by $C_1$-$C_{22}$ alkyl groups or by halogen atoms, as well as aliphatic $C_2$-$C_{22}$ monocarboxylic acid chlorides are also possible chain stoppers for the production of the aromatic polycarbonates.

The quantity of chain stoppers is 0.1 to 10 mol. % in each case, in relation to mols of diphenols in the case of the phenolic chain stoppers, and to mols of dicarboxylic acid dichlorides in the case of the monocarboxylic acid chain stopper. The aromatic polycarbonates may also have aromatic hydroxycarboxylic acids incorporated in them.

The aromatic polycarbonates may be either linear or branched in the known way (see also DE-A 2940024 and DE-A 3007934).

As branching agents it is possible to use e.g. trifunctional or polyfunctional carboxylic acid chlorides, such as trimesic acid trichloride, cyanuric acid trichloride, 3,3'-4,4'-benzophenone-tetracarboxylic acid tetrachloride, 1,4,5,8-naphthaline tetracarboxylic acid tetrachloride or pyromellitic acid tetrachloride, in quantities of 0.01 to 1.0 mol. % (in relation to the dicarboxylic acid dichlorides used) or 3- or polyfunctional phenols, such as phloroglucinol, 4,6-dimethyl-2,4,6-tri-(4-hydroxyphenyl)-heptene-2,4,4-dimethyl-2,4-6-tri-(4-hydroxyphenyl)-heptane, 1,3,5-tri-(4-hydroxyphenyl)- benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis (2-hydroxy-5-methyl-benzyl)-4-methyl-phenol, 2-(4-hydroxyphenyl)-2-(2,4-dihydroxyphenyl)-propane, tetra-(444-hydroxyphenyl isopropyl]-phenoxy)-methane, 1,4-bis[4,4'-dihydroxytriphenyl)-methyl-benzene, may be used as branching agents in quantities of 0.01 to 1.0 mol. % in relation to the diphenols used. Phenolic branching agents may be added with the diphenols, acid chloride branching agents may be introduced together with the acid chlorides.

The proportion of carbonate structural units in the thermoplastic aromatic polycarbonates may be varied. The proportion of carbonate groups is preferably up to 100 mol. %, in particular up to 80 mol. %, most preferably up to 50 mol. % in relation to the sum of ester groups and carbonate groups. Both the ester and the carbonate content of the aromatic polycarbonates may be present in the form of blocks or distributed at random in the polycondensate.

Preferably, the aromatic polycarbonates used according to the present invention have a weight average molecular weight (Mw) of at least 10 000 g/mol, preferably of 20 000 g/mol to 300 000 g/mol.

The thermoplastic aromatic polycarbonates may be used alone or in any mixture.

Advantageously, the polycarbonate is present in the polymer composition in amount ranging from 20 wt % to 28 wt %, preferably from 20 wt % to 25 wt %, relative to the total weight of the composition.

Polybutylene Terephthalate

According to the first aspect of the present invention, a polybutylene terephthalate is used in the polymer composition.

The polybutylene terephthalate resin is obtained by polycondensing terephthalic acid with a glycol component containing an alkylene glycol having 4 carbon atoms (1,4-butanediol) or its combination with a glycol component (comonomer component) other than 1,4-butanediol.

The polybutylene terephthalate resin is not limited to homopolybutylene terephthalate resin containing 100 mol % of a butylene terephthalate unit, and may be a copolymer containing 60 mol % or more (particularly 75 mol % or more and 95 mol % or less) of a butylene terephthalate unit.

The amount of the terminal carboxyl group of the polybutylene terephthalate resin is not particularly limited as long as it does not interfere with the object of the present invention.

The intrinsic viscosity of the polybutylene terephthalate resin is not particularly limited as long as it does not interfere with the object of the present invention.

The intrinsic viscosity (IV) of the polybutylene terephthalate resin is preferably 0.60 dL/g or more and 1.2 dL/g or less. It is more preferably 0.65 dL/g or more and 0.9 dL/g or less.

It is possible to adjust intrinsic viscosity by blending polybutylene terephthalate resins each having a different intrinsic viscosity. For example, a polybutylene terephthalate resin having an intrinsic viscosity of 0.9 dL/g can be prepared by blending a polybutylene terephthalate resin having an intrinsic viscosity of 1.0 dL/g and a polybutylene terephthalate resin having an intrinsic viscosity of 0.7 dL/g. The intrinsic viscosity (IV) of the polybutylene terephthalate resin can be measured, for example, in o-chlorophenol at a temperature of 35° C.

Examples of the glycol component (comonomer component) other than 1,4-butanediol in the polybutylene terephthalate resin include ethylene glycol and propylene glycol. These glycol components can be used alone, or two or more glycol components can be used in combination.

As examples for PBT used in the composition according to present invention, mention can be made to polybutylene terephthalate (PBT) sold by Taiwan Changchun (CCP) as PBT 1100-211D with an intrinsic viscosity of 0.88 dL/g as measured in a 60:40 phenol/tetrachloroethane.

In a preferred embodiment, the polybutylene terephthalate is present in the polymer composition in an amount from 40 wt % to 55 wt %.

In a more preferred embodiment, the polybutylene terephthalate is present in the polymer composition in an amount from 40 wt % to 50 wt %.

The inventors found that when the weight ratio of polycarbonate to PBT is 1:2, higher bonding strength between metal and polymer composition can be achieved.

Reinforcement Fiber

According to the first aspect of the present invention, a reinforcement fiber is used in the polymer composition.

Preferably, the reinforcement fiber is a glass fiber.

In a preferred embodiment, the glass fiber used is selected from E-glass, S-glass, AR-glass, T-glass, D-glass and R-glass.

In a more preferred embodiment, the glass fiber is a D-glass.

In a more preferred embodiment, the glass fiber is low dielectric constant glass fibers, which have appreciably lower amounts of alkaline oxides (sodium oxide, potassium oxide, lithium oxide etc.) and alkaline earth oxides (calcium oxide, magnesium oxide etc.) than E-glass.

The glass fibers can be made by standard processes, e.g., by steam or air blowing, flame blowing, and mechanical pulling.

Optionally, the glass fiber is sized with a coating agent commonly used for glass fibers. If presents, the coating agent is present in an amount from 0.1 wt % to 5 wt %, preferably from 0.1 wt % to 2 wt %, based on the weight of the glass fibers.

During production of the glass fibers, a number of filaments can be formed simultaneously, sized with the coating agent and then bundled into what is called a strand.

Alternatively the strand itself may be first formed of filaments and then sized. The amount of sizing employed is generally that amount which is sufficient to bind the glass filaments into a continuous strand and ranges from 0.1 wt % to 5 wt %, 0.1 wt % to 2 wt % based on the weight of the glass fibers. Generally, this may be 1.0 wt % based on the weight of the glass filament.

The glass fiber can be continuous or chopped.

Glass fibers in the form of chopped strands may have a length of 0.2 millimeter (mm) to 10 centimeters (cm), specifically 0.5 mm to 5 cm.

The glass fiber may have a round (or circular), flat, or irregular cross-section. Thus, use of fiber with a non-round cross section is possible.

In an embodiment, the glass fiber has a circular cross-section.

In an embodiment, the diameter of the glass fiber is from 1 to 25 micrometers (μm).

In an embodiment, the diameter of the glass fiber is from 4 to 20 μm.

In an embodiment, the diameter of the glass fiber is from 5 to 17 μm.

In an embodiment, the glass fiber has a diameter from 7 µm to 17 µm.

Preferably, the glass fiber component is present in an amount from greater than 5 wt % to 25 wt %. In a still further aspect, the glass fiber component is present in an amount from greater than 10 wt % to 25 wt %. In a yet further aspect, the glass fiber component is present in an amount from greater than 15 wt % to 25 wt %.

Glass Bubbles

According to the first aspect of the present invention, glass bubbles are used in the polymer composition.

Preferably, the glass bubble has a circular cross-section.

In some preferred embodiments, the diameter of the glass bubble is from 1 to 50 micrometers (µm), preferably from 5 to 40 µm, more preferably from 10 to 35 µm.

In some preferred embodiments, the diameter of the glass bubble is from 15 to 30 micrometers (µm).

Preferably, the crash pressure of the glass bubble is greater than 110 MPa.

More preferably, the glass bubbles are present in an amount from 4 wt % to 10 wt %.

Transesterification inhibitor According to the first aspect of the present invention, a transesterification inhibitor is used in the polymer composition.

The transesterification inhibitor comprises a phosphorus-containing stabilizer.

In an embodiment, the transesterification inhibitor is an acidic phosphate salt, e.g. monozinc phosphate, sodium dihydrogen phosphate, potassium hydrogen phosphate, calcium hydrogen phosphate, sodium acid pyrophosphate and mixtures thereof.

In another embodiment, the transesterification inhibitor is a phosphite compound, e.g. a phosphite compound of the general formula (V):

$$P\text{---}(OR^1)_3 \qquad (V)$$

wherein each $R^1$ is the same or different and independently represents hydrogen, alkyl groups, aryl groups or any mixture thereof provided that at least one of the $R^1$ groups is hydrogen or alkyl.

These include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof.

In still another embodiment, the transesterification inhibitor is a phosphorous oxoacid such as phosphorous acid, phosphoric acid, polyphosphoric acid, or hypophosphorous acid. Preferably, the transesterification inhibitor is phosphorous acid.

Preferably, the transesterification inhibitor is present in an amount from 0.5 wt % to 1.5 wt %, preferably from 0.8 wt % to 1.5 wt %.

Additives

In addition to the foregoing components, the polymer composition according to the present invention can optionally comprise a balance amount of one or more additives, with the proviso that the additives are selected so as to not significantly adversely affect the desired properties of the polymer composition according to the present invention.

Combinations of additives can be used. Such additives can be mixed at a suitable time during the mixing of the components for forming the composition. Exemplary and non-limiting examples of additives that can be present in the polymer composition according to the present invention include additional reinforcing fillers, an acid scavenger, anti-drip agent, antioxidant, antistatic agent, chain extender, colorant (e.g., pigment and/or dye), demolding agent, flow promoter, lubricant, mold release agent, plasticizer, inhibitor, flame retardant stabilizer (including for example a thermal stabilizer, a hydrolytic stabilizer, or a light stabilizer), impact modifier, UV absorbing additive, and UV reflecting additive, or any combination thereof.

The polymer composition can be in the form of, for example, pellets.

The polymer composition according to the present invention can be prepared by a variety of methods involving intimate admixing of the materials desired in the composition.

For example, the materials desired in the composition are first blended in a high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include: co-rotating and counter-rotating extruders, single screw extruders, co-kneaders, and various other types of extrusion equipments.

The temperature of the melt in the processing is preferably minimized in order to avoid excessive degradation of the polymers. It is often desirable to maintain the melt temperature between 230° C. and 350° C. in the molten resin composition, although higher temperatures can be used provided that the residence time of the resin in the processing equipment is kept short.

In some embodiments, the melt processed composition exits processing equipment such as an extruder through small exit holes in a die. The resulting strands of the molten resin are cooled by passing the strands through a water bath. The cooled strands can be shopped into small pellets for packaging and further handling.

The polymer composition according to the present invention can be molded by a variety of means such as injection molding, extrusion, rotational molding, blow molding and thermoforming to form articles and structural components of, for example, personal computers, notebook and portable computers, and other such equipment, medical applications, RFID (radio frequency identification) applications, automotive applications, and the like.

According to another aspect, the present invention provides an article comprising:

a metal substrate; and a plastic part made from the polymer composition according to the present invention on the metal substrate.

Metal Substrate

The metal is not particularly limited, and examples thereof include aluminum, copper, iron, magnesium, nickel and titanium. Preferably, the metal substrate is an aluminum substrate.

There is no particular limitation on the shape of the metal substrate. Various shapes of substrate such as a plate, a sheet, a cylinder and a rod can be used.

The metal substrate may have various components necessary for assembling the final product, such as an electronic product, such as a boss screw, a rib for reinforcement, an insertion hole for mounting other part, and the like.

Preferably, the metal substrate has nano-pores having a diameter of 10 nm to 30 nm on part of the surface thereof, so that the some of the polymer composition according to the present invention can fill into the nano-pores.

The nano-pores on the surface of the metal substrate can be produced by surface treatment, for example, a chemical etching process, a dipping process, or an anodic oxidation process.

According to still another aspect, the present invention provides a process for producing an article according to the present invention, comprising:

forming a plastic part with the polymer composition according to the present invention on the metal substrate.

As mentioned previously, the metal substrate may have nano-pores having a diameter of 10 nm to 30 nm on part of the surface thereof. Such a metal substrate can be purchased or prepared according to a known method in the art.

Thus, in an embodiment, the process for producing an article according to the present invention further comprises surface-treating a metal substrate to form a plurality of nano-pores having a diameter of 10 nm to 30 nm on the metal substrate.

The surface treating process is not particularly limited, and it can be a chemical etching process, a dipping process, or an anodic oxidation process.

Taking chemical etching as an example, the metal substrate can be immersed in an etching solution to form nano-pores in at least a part of the surface of the metal substrate.

Thus, in an embodiment, the process for producing an article according to the present invention comprising:

Step S1: treating the surface of a metal substrate to form nano-pores having a diameter of 10 nm to 30 nm on at least a part of the surface of the metal substrate; and Step S2: injection molding the polymer composition according to the present invention onto the treated surface of the metal substrate to form a plastic part on the metal substrate.

In a preferred embodiment, Steps 51 and S2 can be carried out by Nano-molding technology (NMT).

Accordingly, the NMT is carried out by treating the surface of the metal substrate to form a plurality of nano-pores having a diameter of 10 nm to 30 nm on at least a part of the surface of the metal substrate. Then the metal substrate having nano-pores is put into a mold and the polymer composition is filled into the gaps between the mold and the metal substrate to form a plastic part.

In an embodiment, step S2 is followed by subjecting the composite to annealing under a temperature of 50° C. to 200° C. for 1-2 hours.

Thus according to an embodiment, the process for producing an article according to the present invention comprising:

Step S1: treating the surface of a metal substrate to form nano-pores having a diameter of 10 nm to 30 nm on at least a part of the surface of the metal substrate; and Step S2: injection molding the polymer composition according to the present invention onto the treated surface of the metal substrate to form a plastic part on the metal substrate; and Step S3: subjecting the article from S2 to annealing under a temperature of 50° C. to 200° C. for 1-2 hours.

In an embodiment, step S3 is followed by subjecting the composite to anodizing.

Thus according to an embodiment, the process for producing an article according to the present invention comprising:

Step S1: treating the surface of a metal substrate to form nano-pores having a diameter of 10 nm to 30 nm on at least a part of the surface of the metal substrate; and Step S2: injection molding the polymer composition according to the present invention onto the treated surface of the metal substrate to form a plastic part on the metal substrate; and Step S3: subjecting the article from S2 to annealing under a temperature of 50° C. to 200° C. for 1-2 hours; and Step S4: subjecting the article from S3 to anodizing.

The anodizing can be carried out according to common technical in the art. For example, the anodizing may comprise: placing a part of the surface of the composite to be anodized, as an anode in a $H_2SO_4$ solution with a concentration of 10 wt % to 30 wt %; and electrolyzing the part of the surface of the composite at a temperature of 10° C. to 30° C., at a voltage of 10V to 100V for 1 min to 40 min.

The anodization treatment may use traditional equipments, for example, an anodization tank.

According to some embodiments, the oxidized layer formed by means of anodization treatment may have a preferred thickness of 1 μm to 10 μm, preferably 1 μm to 5 μm. According to some embodiments of present disclosure, the nanopores of the oxidized layer may have an average diameter of 10 nm to 100 nm, preferably 20 nm to 80 nm, and further preferred 20 nm to 60 nm.

The following examples are put forth so as to provide those of ordinary skill in the art with a complete disclosure and description of how the compositions, articles, and methods claimed herein are made and evaluated, and are intended to be purely exemplary and are not intended to limit the disclosure.

EXAMPLES

Materials

High heat copolycarbonate: a copolymer based on BPA polycarbonate and TMC polycarbonate, the weight ratio of BPA to TMC is 56:44, available from Covestro polymer (China) Co. Ltd as Apec1895.

BPA PC: Linear bisphenol A polycarbonate, Makrolon 2600, available from Covestro polymer (China) Co. Ltd, the weight-average molecular weight is 26000 g/mol.

PBT: Polybutylene terephthalate, available from Taiwan Changchun (CCP) as PBT 1100-211D, having an intrinsic viscosity (IV) of 0.88 dl/g.

Glass bubbles: D50: 18 μm in diameter, available from 3M as Im30k with a crash pressure of greater than 186 MPa.

Glass fiber with low Dielectric Constant (Dk): D-glass fiber, 13 μm in diameter, 3.3 cm in length, available from CPIC as ECS303N-3.

Phosphorous acid: $H_3PO_3$.

PETS: Pentaerythritol tetrastearate powder, a mold release agent.

Aluminum sheet: having nano-pores having a diameter of 10 nm to 30 nm, available as 6063 from Foshan Sanshui Zhengyu Aluminum Products Co., Ltd.

Inventive Example 1

23.78 parts by weight of high heat copolycarbonate (Apec1895), 48.03 parts by weight of PBT (PBT 1100-

211D), 6.67 parts by weight of glass bubbles (Im30k), 20.00 parts by weight of glass fiber (ECS303N-3-K/HL), 1.02 parts by weight of transesterification (H$_3$PO$_3$) and 0.50 part by weight of mold release agent (PETS) were mixed in a mixer and fed into an extruder, the extruate from the extruder was then quenched and pelletized to give the polymer composition IE1 in the form of pellets.

The polymer composition in the form of pellets was dried at 100° C. for 4 hours to have a water content of less than 0.02 wt. %. Then the polymer composition is injection molded onto an aluminum sheet with nano-pores having a diameter of 10 nm to 30 nm to form a composite, wherein the polymer composition was molded into a plastic part. The following process conditions are used during the injection molding:

The process conditions for injection molding

| | |
|---|---|
| Mold temp. (° C.) | 150 |
| Injection Speed 1 (mm/s) | 120 |
| Injection Speed 2 (mm/s) | 80 |
| Holding Pressure 1 (Mpa) | 150 |
| Holding Pressuretime 1 (S) | 4 |
| Holding Pressure 2 (Mpa) | 120 |
| Holding Pressuretime 2 (S) | 1 |
| V/P Pressure (Mpa) | 128 |
| Cycle time (S) | 26 |

The bonding strength between the plastic part and the aluminum sheet was measured with a UTM tensile machine according to ISO 19095-2015 and referred to "as mold" and recorded in table 1.

In particular, the bonding strength was measured as follows:

i) recording the force when the molded part is pulled until the breaking point; and ii) converting the force to the bonding strength (in MPa) by dividing the force by bonding area.

Then the composite was subjected to annealing in an oven for 1 h at 120° C. and the bonding strength between the plastic part and the aluminum sheet was measured and referred to "annealed" and recorded in table 1 below.

At last, the composite was subjected to anodizing in H$_2$SO$_4$ solution with a concentration of 20 wt % at a temperature of 20° C. and a voltage of 50V for 20 minutes and the bonding strength between the plastic part and the aluminum sheet was measured and referred to "annealed & anodized" and recorded in table 1 below.

Comparative Example 1

25.78 parts by weight of high heat copolycarbonate (Apec1895), 52.70 parts by weight of PBT (PBT 1100-211D), 20.00 parts by weight of glass bubbles (Im30k), 1.02 parts by weight of transesterification (H$_3$PO$_3$) and 0.50 part by weight of mold release agent (PETS) were mixed in a mixer and fed into an extruder, the extruate from the extruder was then quenched and pelletized to give the polymer composition CE1 in the form of pellets.

Following the procedure as mentioned in Inventive Example 1 to obtain a plastic part and test the bonding strengths accordingly, except that the following process conditions are used during the injection molding:

The process conditions for injection molding

| | |
|---|---|
| Mold temp. (° C.) | 150 |
| Injection Speed 1 (mm/s) | 120 |
| Injection Speed 2 (mm/s) | 80 |
| Holding Pressure 1 (Mpa) | 150 |
| Holding Pressuretime 1 (S) | 4 |
| Holding Pressure 2 (Mpa) | 120 |
| Holding Pressuretime 2 (S) | 1 |
| V/P Pressure (Mpa) | 118 |
| Cycle time (S) | 26 |

Comparative Example 2

35.66 parts by weight of high heat copolycarbonate (Apec1895), 36.15 parts by weight of PBT (PBT 1100-211D), 6.67 parts by weight of glass bubbles (Im30k), 20.00 parts by weight of glass fiber (ECS303N-3-K/HL), 1.02 parts by weight of transesterification (H$_3$PO$_3$) and 0.50 part by weight of mold release agent (PETS) were mixed in a mixer and fed into an extruder, the extruate from the extruder was then quenched and pelletized to give the polymer composition CE2 in the form of pellets.

Following the procedure as mentioned in Inventive Example 1 to obtain a plastic part and test the bonding strengths accordingly, except that the following process conditions are used during the injection molding:

The process conditions for injection molding

| | |
|---|---|
| Mold temp. (° C.) | 130 |
| Injection Speed 1 (mm/s) | 120 |
| Injection Speed 2 (mm/s) | 80 |
| Holding Pressure 1 (Mpa) | 150 |
| Holding Pressure time 1 (S) | 4 |
| Holding Pressure 2 (Mpa) | 120 |
| Holding Pressure time 2 (S) | 1 |
| V/P Pressure (Mpa) | 91 |
| Cycle time (S) | 28 |

Inventive Example 2

23.78 parts by weight of polycarbonate (BPA PC), 48.03 parts by weight of PBT (PBT 1100-211D), 6.67 parts by weight of glass bubbles (Im30k), 20.00 parts by weight of glass fiber (ECS303N-3-K/HL), 1.02 parts by weight of transesterification (H$_3$PO$_3$) and 0.50 part by weight of mold release agent (PETS) were mixed in a mixer and fed into an extruder, the extruate from the extruder was then quenched and pelletized to give the polymer composition IE2 in the form of pellets.

Following the procedure as mentioned in Inventive Example 1 to obtain a plastic part and test the bonding strengths accordingly, except that the following process conditions are used during the injection molding:

The process conditions for injection molding

| | |
|---|---|
| Mold temp. (° C.) | 150 |
| Injection Speed 1 (mm/s) | 120 |
| Injection Speed 2 (mm/s) | 80 |
| Holding Pressure 1 (Mpa) | 150 |
| Holding Pressure time 1 (S) | 4 |
| Holding Pressure 2 (Mpa) | 120 |
| Holding Pressure time 2 (S) | 1 |
| V/P Pressure (Mpa) | 134 |
| Cycle time (S) | 26 |

Comparative Example 3

25.78 parts by weight of polycarbonate (BPA PC), 52.70 parts by weight of PBT (PBT 1100-211D), 20.0 parts by weight of glass bubbles (Im30k), 1.02 parts by weight of transesterification ($H_3PO_3$) and 0.50 part by weight of mold release agent (PETS) were mixed in a mixer and fed into an extruder, the extruate from the extruder was then quenched and pelletized to give the polymer composition CE3 in the form of pellets.

Following the procedure as mentioned in Inventive Example 1 to obtain a plastic part and test the bonding strengths accordingly, except that the following process conditions are used during the injection molding:
The process conditions for injection molding

| | |
|---|---|
| Mold temp. (° C.) | 150 |
| Injection Speed 1 (mm/s) | 120 |
| Injection Speed 2 (mm/s) | 80 |
| Holding Pressure 1 (Mpa) | 150 |
| Holding Pressuretime 1 (S) | 4 |
| Holding Pressure 2 (Mpa) | 120 |
| Holding Pressuretime 2 (S) | 1 |
| V/P Pressure (Mpa) | 133 |
| Cycle time (S) | 26 |

Comparative Example 4

73.33 parts by weight of PBT (PBT 1100-211D), 6.67 parts by weight of glass bubbles (Im30k), and 20.00 parts by weight of glass fiber (ECS303N-3-K/HL) were mixed in a mixer and fed into an extruder, the extruate from the extruder was then quenched and pelletized to give the polymer composition CE4 in the form of pellets.

Following the procedure as mentioned in Inventive Example 1 to obtain a plastic part and test the bonding strengths accordingly, except that the following process conditions are used during the injection molding:
The process conditions for injection molding

| | |
|---|---|
| Mold temp. (° C.) | 150 |
| Injection Speed 1 (mm/s) | 120 |
| Injection Speed 2 (mm/s) | 80 |
| Holding Pressure 1 (Mpa) | 150 |
| Holding Pressure time 1 (S) | 4 |
| Holding Pressure 2 (Mpa) | 120 |
| Holding Pressure time 2 (S) | 1 |
| V/P Pressure (Mpa) | 151 |
| Cycle time (S) | 26 |

Comparative Example 5

48 parts by weight of polycarbonate (BPA PC), 23.78 parts by weight of PBT (PBT 1100-211D), 6.70 parts by weight of glass bubbles (Im30k), 20.00 parts by weight of glass fiber (ECS303N-3-K/HL), 1.02 parts by weight of transesterification ($H_3PO_3$) and 0.50 part by weight of mold release agent (PETS) were mixed in a mixer and fed into an extruder, the extruate from the extruder was then quenched and pelletized to give the polymer composition CE5.

Following the procedure as mentioned in Inventive Example 1 to obtain a plastic part and test the bonding strengths accordingly, except that the following process conditions are used during the injection molding:
The process conditions for injection molding

| | |
|---|---|
| Mold temp. (° C.) | 130 |
| Injection Speed 1 (mm/s) | 120 |
| Injection Speed 2 (mm/s) | 80 |
| Holding Pressure 1 (Mpa) | 150 |
| Holding Pressure time 1 (S) | 4 |
| Holding Pressure 2 (Mpa) | 120 |
| Holding Pressure time 2 (S) | 1 |
| V/P Pressure (Mpa) | 79 |
| Cycle time (S) | 32 |

Comparative Example 6

35.66 parts by weight of polycarbonate (BPA PC), 36.15 parts by weight of PBT (PBT 1100-211D), 6.67 parts by weight of glass bubbles (Im30k), 20.00 parts by weight of glass fiber (ECS303N-3-K/HL), 1.02 parts by weight of transesterification ($H_3PO_3$) and 0.50 part by weight of mold release agent (PETS) were mixed in a mixer and fed into an extruder, the extruate from the extruder was then quenched and pelletized to give the polymer composition CE5.

Following the procedure as mentioned in Inventive Example 1 to obtain a plastic part and test the bonding strengths accordingly, except that the following process conditions are used during the injection molding:
The process conditions for injection molding

| | |
|---|---|
| Mold temp. (° C.) | 130 |
| Injection Speed 1 (mm/s) | 120 |
| Injection Speed 2 (mm/s) | 80 |
| Holding Pressure 1 (Mpa) | 150 |
| Holding Pressure time 1 (S) | 4 |
| Holding Pressure 2 (Mpa) | 120 |
| Holding Pressure time 2 (S) | 1 |
| V/P Pressure (Mpa) | 91 |
| Cycle time (S) | 30 |

TABLE 1

Components of the polymer compositions and Bonding strengths obtained

| | IE1 | CE1 | CE2 | IE2 | CE3 | CE4 | CE5 | CE6 |
|---|---|---|---|---|---|---|---|---|
| PBT 1100-211D | 48.03 | 52.70 | 36.15 | 48.03 | 52.70 | 73.33 | 23.78 | 36.15 |
| APEC 1895 | 23.78 | 25.78 | 35.66 | | | | 48 | |
| BPA PC | | | | 23.78 | 25.78 | | | 35.66 |
| Im30k | 6.67 | 20.00 | 6.67 | 6.67 | 20.00 | 6.67 | 6.70 | 6.67 |
| ECS303N-3-K/HL | 20.0 | 0 | 20.00 | 20.0 | 0 | 20.00 | 20.00 | 20.00 |
| PETS | 0.5 | 0.50 | 0.50 | 0.5 | 0.50 | 0 | 0.50 | 0.50 |
| $H_3PO_3$ | 1.02 | 1.02 | 1.02 | 1.02 | 1.02 | 0 | 1.02 | 1.02 |

TABLE 1-continued

Components of the polymer compositions and Bonding strengths obtained

| | | IE1 | CE1 | CE2 | IE2 | CE3 | CE4 | CE5 | CE6 |
|---|---|---|---|---|---|---|---|---|---|
| Bonding strength | as mold | 33.79 | 26.30 | 20.29 | 36.27 | 29.11 | 23.90 | 21.69 | 24.75 |
| | annealed | 34.26 | 26.60 | 17.07 | 37.03 | 27.92 | 25.51 | 20.83 | 26.85 |
| | annealed & anodized | 34.49 | 25.41 | 18.44 | 35.04 | 25.49 | 24.04 | 19.39 | 21.65 |

As illustrated in Table 1, in inventive examples (IE1 and IE2), the composites obtained demonstrated good bonding strength between the plastic part and the metal sheet.

The bonding strength between the plastic part and the metal sheet in any of comparative examples (CE1-6) is much lower than that in any of inventive examples (IE1 and IE2).

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A polymer composition comprising:
A). from 20 wt % to 30 wt % of a polycarbonate;
B). from 40 wt % to 60 wt % of a polybutylene terephthalate;
C). from 5 wt % to 30 wt % of a reinforcement fiber;
D). from 1 wt % to 10 wt % of glass bubbles, and
E). from 0.3 wt % to 2 wt % of transesterification inhibitor, all contents are based on the total weight of the composition.

2. The composition according to claim 1, wherein the polycarbonate is an aromatic polycarbonate derived from reaction of a diphenol of the formula (I) with a carbonic acid halide,

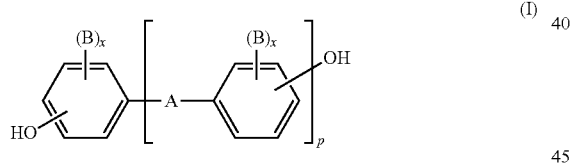

(I)

wherein
A is a single bond, $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene, onto which further aromatic rings, optionally containing heteroatoms, may be condensed, or a group of the formula (II) or (III):

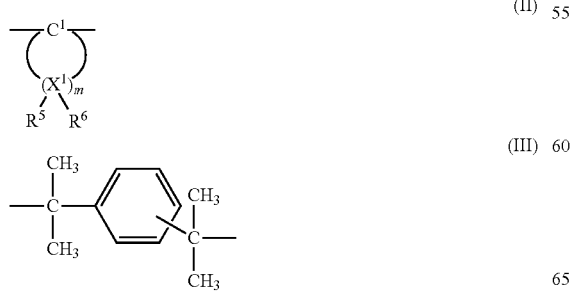

(II)

(III)

B is, in each case, $C_1$-$C_{12}$-alkyl,
x in each case, independently of each other, is 0, 1 or 2,
p is 1 or 0, and
$R^5$ and $R^6$ may be selected individually for each X', independently of each other, as hydrogen or $C_1$-$C_6$-alkyl,
$X^1$ is carbon, and
m is an integer from 4 to 7,
provided that $R^5$ and $R^6$ are both alkyl on at least one $X^1$ atom.

3. The composition according to claim 2, wherein the diphenol is selected from 4,4'-dihydroxydiphe-nyl, bisphenol A, 2,4-bis(4-hydroxyphenyl)-2-methylbu-tane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives, diphenols of general formula (IVa):

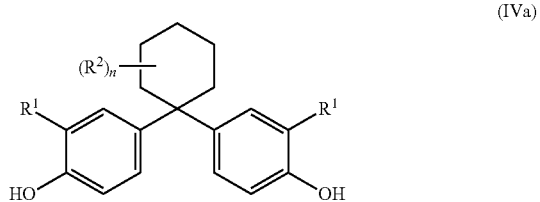

(IVa)

in which
$R^1$ represents hydrogen or $C_1$-$C_4$-alkyl,
$R^2$ represents $C_1$-$C_4$-alkyl,
n represents 0, 1, 2 or 3, and
diphenols of general formulae (IVb), (IVc) and (IVd):

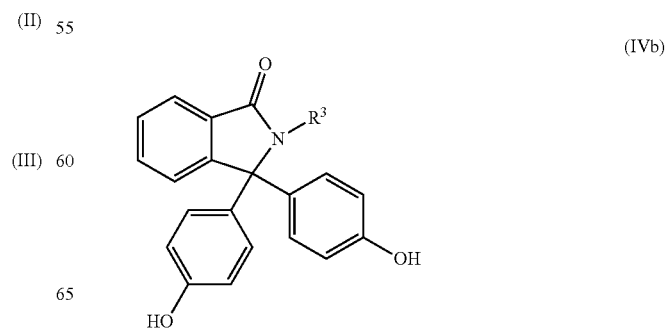

(IVb)

-continued

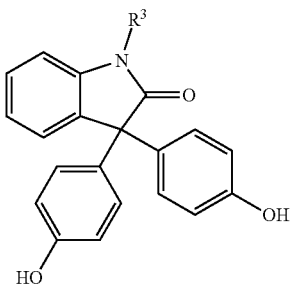
(IVc)

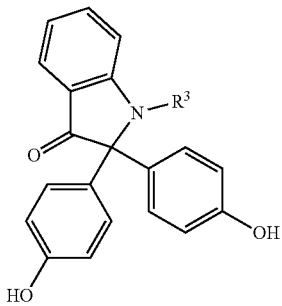
(IVd)

in which $R^3$ represents $C_1$-$C_4$-alkyl, aralkyl or aryl.

4. The composition according to claim 1, wherein the polycarbonate is based on bisphenol A (2,2-bis-(4-hydroxyphenyl)-propane), or based on bisphenol A and 1,1-bis-(4-hydroxyphenyl)-3,3,5-trimethylcyclohexane (Bisphenol TMC) having the formula (IVa"):

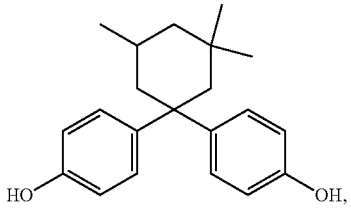
(IVa")

the molar ratio of diphenol of the formula (IVa") to bisphenol A is between 1%: 99% and 99%:1%.

5. The composition according to claim 1, wherein the reinforcement fiber is a glass fiber, selected from the group consisting of E-glass, S-glass, AR-glass, T-glass, D-glass and R-glass.

6. The composition according to claim 1, wherein the diameter of the glass bubble is from 1 to 50 μm.

7. The composition according to claim 1, wherein the transesterification inhibitor is a phosphorus-containing stabilizer selected from an acidic phosphate salt, a phosphite compound, and a phosphorous oxoacid.

8. The composition according to claim 7, wherein the acidic phosphate salt is selected from the group consisting of monozinc phosphate, sodium dihydrogen phosphate, potassium hydrogen phosphate, calcium hydrogen phosphate, sodium acid pyrophosphate and mixtures thereof, the phosphite compound is selected those of the general formula (V):

$$P-(OR^1)_3 \quad (V)$$

wherein each $R^1$ is the same or different and independently represents hydrogen, alkyl groups, aryl groups or any mixture thereof provided that at least one of the R' groups is hydrogen or alkyl, and the phosphorous oxoacid is selected from the group consisting of phosphorous acid, phosphoric acid, polyphosphoric acid, hypophosphorous acid and mixtures thereof.

9. An article, comprising:
a metal substrate; and
a plastic part made from the polymer composition according to claim 1 on the metal substrate.

10. The article according to claim 9, wherein the metal substrate is an aluminum sheet.

11. The article according to claim 9, which is a shell for mobile phones.

12. A process for producing an article comprising:
forming a plastic part with the polymer composition according to claim 1 on a metal substrate.

13. A process for producing an article according to claim 12, comprising:
Step S1: treating the surface of a metal substrate to form nano-pores having a diameter of 10 nm to 30 nm on at least a part of the surface of the metal substrate; and
Step S2: injection molding the polymer composition according to claim 1 onto the treated surface of the metal substrate to form a plastic part on the metal substrate.

14. A process for producing an article comprising:
forming a plastic part on a metal substrate with a polymer composition comprising,
A). from 20 wt % to 30 wt % of a polycarbonate;
B). from 40 wt % to 60 wt % of a polybutylene terephthalate;
C). from 5 wt % to 30 wt % of a reinforcement fiber;
D). from 1 wt % to 10 wt % of glass bubbles, and
E). from 0.3 wt % to 2 wt % of transesterification inhibitor,
wherein all contents are based on the total weight of the composition, and wherein the steps of the process comprise,
Step S1: treating the surface of a metal substrate to form nano-pores having a diameter of 10 nm to 30 nm on at least a part of the surface of the metal substrate,
Step S2: injection molding the polymer composition onto the treated surface of the metal substrate to form a plastic part on the metal substrate, and
Step S3: Subjecting the article from S2 to annealing under a temperature of 50° C. to 200° C. for 1-2 hours.

15. A process for producing an article comprising:
forming a plastic part on a metal substrate with a polymer composition comprising,
A). from 20 wt % to 30 wt % of a polycarbonate;
B). from 40 wt % to 60 wt % of a polybutylene terephthalate;
C). from 5 wt % to 30 wt % of a reinforcement fiber;
D). from 1 wt % to 10 wt % of glass bubbles, and
E). from 0.3 wt % to 2 wt % of transesterification inhibitor,
wherein all contents are based on the total weight of the composition, and wherein the steps of the process comprise,
Step S1: treating the surface of a metal substrate to form nano-pores having a diameter of 10 nm to 30 nm on at least a part of the surface of the metal substrate,
Step S2: injection molding the polymer composition onto the treated surface of the metal substrate to form a plastic part on the metal substrate, Step S3: Subjecting the article from S2 to annealing under a temperature of 50° C. to 200° C. for 1-2 hours,
Step S4: subjecting the article from S3 to anodizing.

* * * * *